Patented Jan. 14, 1947

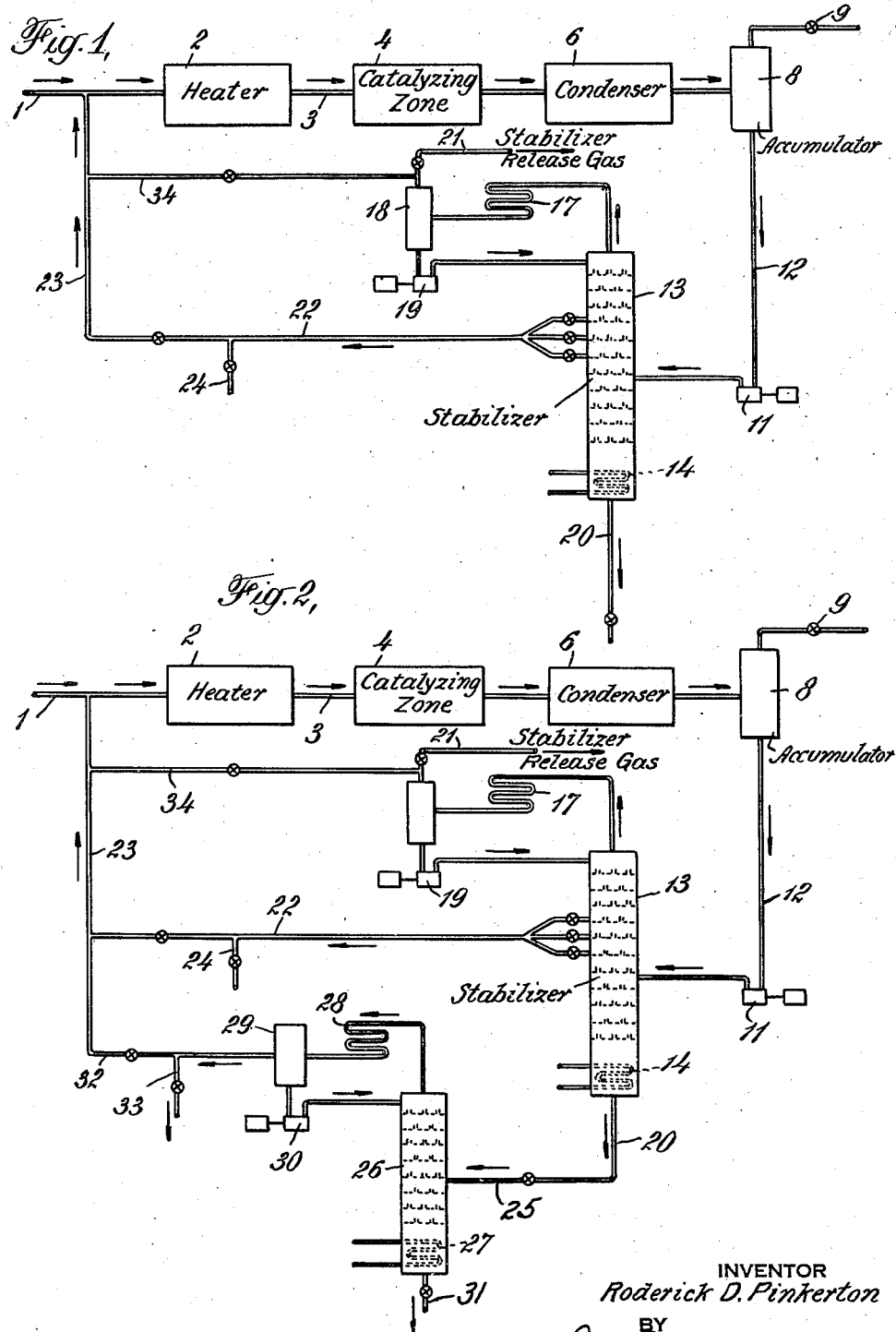

2,414,328

UNITED STATES PATENT OFFICE 2,414,328

METHOD OF OPERATING POLYMERIZATION PLANTS

Roderick Donald Pinkerton, Chicago, Ill., assignor to Sinclair Refining Company, New York, N. Y., a corporation of Maine Application April 2, 1941, Serial No. 386,423

7 Claims. (Cl. 260—683.15)

This invention relates to the processing treatment of hydrocarbon mixtures containing olefins. The invention provides an improved process for the production of polymerized olefins from hydrocarbon gas mixtures containing olefins with increases in the efficiency and flexibility of operation. My improved method of operating a polymerization plant is of especial value where the polymerization plant is intended to be operated in conjunction with an alkylation process in that it provides for total retention of isobutane in the liquefied products recovered from the polymerization process. In such combined operations such retention is a factor of major importance.

With the automobile and aeroplane industries producing motors having progressively higher compression ratios and greater speed, the oil industry has been called upon to produce motor fuel gasoline making it possible for these motors to function properly. The gasoline required for the modern motor is characterized by a higher anti-knock value (commonly stated as octane rating at the present) than has heretofore been demanded. The oil industry has met this demand for relatively high octane gasoline to a large extent by polymerizing gaseous olefins occurring in gases produced during pyrolytic conversion of petroleum or during pyrolytic decomposition of natural gas. It has also resorted to alkylation processes in which isoparaffins, preferably isobutane, are condensed with olefins.

One general form of polymerization process comprises heating the olefin-bearing gases in a furnace to a temperature of about 450° F. under a pressure of 150–200 pounds per square inch, and flowing the heated gases over a catalyst, such as ortho-phosphoric acid distributed on a porous carrier arranged in one or more catalyst chambers. Several such chambers usually are arranged in series. Under these conditions a catalytic condensation or polymerization of the olefins present in the gases takes place with the formation of a normally liquid product and a normally gaseous product. The time, temperature, and pressure are so controlled that the products of the catalytic reaction boil within the gasoline range. A small quantity of steam is usually added, continuously, to the gases passing through the process, this steam serving to prevent dehydration of the catalyst under the operating conditions. The heat liberated by the polymerization of the olefins normally increases the temperature in the catalyst chambers to about 500–550° F. The products of the reaction are passed through a condensing coil to an accumulator. The liquid condensate, comprising unstabilized polymer gasoline, is drawn from the bottom of the accumulator, while uncondensed hydrocarbons, lean with respect to higher olefins, flow from the top of the receiver to be mixed with refinery fuel gas or suitably disposed of in some other manner. The unstabilized polymer gasoline is pumped to a stabilizer comprising a stabilizing tower which is so controlled as to produce a product of the desired vapor pressure by fractionation of the polymer gasoline. Usually the stabilizer is operated at a pressure higher than the polymerizing unit so that material distilled from the unstabilized polymer gasoline may be reintroduced to the polymerization unit without compressing or pumping.

The efficiency of this catalytic process for the polymerization of gaseous olefins is seriously impaired if the rate at which the process gas is passed through the system is appreciably below the capacity for which the system was designed. Moreover, the efficiency of this catalytic process is lowered if the content of the higher olefins in the process gas is too high. By "higher olefins" is meant those olefins containing 3 or more carbon atoms per molecule. These difficulties have been met by recycling a controlled volume of gas lean with respect to its content of higher olefins through the polymerization unit together with fresh process gas. The lean gas thus recirculated has been obtained from various sources including the polymerization process itself and suitable extraneous sources. Usually it has been obtained from an accumulator associated with the stabilizer and into which the products constituting the stabilizer overhead are discharged.

Polymerization of butylenes is effected much more readily than polymerization of propylene. However, it has been observed, particularly in catalytic polymerization processes of the type herein described, that polymerization of propylene in the gaseous-olefin mixture is promoted by an increase in the proportionate amount of butylenes which are present in the mixture. This activation of propylene polymerization is believed to be the result of a simple union of butylene molecules with propylene molecules.

I have discovered that the advantages to be gained by the recycling of gases through the polymerization unit together with the advantages to be gained by an increase in the ratio of butylenes to propylene in the gaseous olefin charge to the polymerization unit may be realized by the recycling of a particular butylene-containing fraction separated from the products of the polymerization unit in a rectifying zone. The butylene-containing mixture to be recycled may advantageously be obtained as a side stream from the stabilizing tower. It may consist essentially of butylene or a butane-butylene mixture. It may also contain propane and propylene. However, it should contain only minor amounts of hydrocarbons containing less than 3 carbon atoms, and the ratio of butylenes to propylene in the mixture should be in excess of the corresponding ratio in the composite gas mixture supplied to the catalyzing zone.

Recirculation to the polymerizing zone of a fraction enriched in hydrocarbons containing 4 carbon atoms per molecule and having a relatively high ratio of butylenes to propylene has many advantages as compared to recirculation of the stabilizer overhead fraction. In addition to the promotion of the propylene polymerization, this form of recycling possesses the further advantage of substantially lowering the vapor pressure of the composite mixture discharged from the catalyzing zone. By lowering this vapor pressure to a value which at about 100° F. is below the discharge pressure at which the catalyzing zone operates most efficiently, it becomes unnecessary either to provide excessive cooling capacity for the products discharged from the catalyzing zone or to release gases from the accumulator into which the cooled products from the catalyzing zone are discharged. The release of gases at this stage is undesirable as this release gas carries with it the equilibrium proportion of isobutane and other hydrocarbons of 4 or more carbon atoms per molecule. Total retention of the $C_4$ hydrocarbons, and of isobutane in particular, is especially desirable if the polymerization process is to be operated in conjunction with an alkylation process. The recycling feature of my process further produces an increase in the polymer gasoline yield in as much as the recycling of the butylene-enriched mixture subjects the unconverted butylenes from the stabilizing tower to additional contact with the catalyst in the polymerization unit. Without this recycling the unconverted butylenes would normally be discharged directly either to the fuel gas released from the polymerization plant or to the liquid polymer gasoline as casinghead. The increased polymerization of the butylenes takes place simultaneously with the increased activation of the propylene polymerization, although the two reactions proceed independently of one another.

The accompanying drawing illustrates, in simplified diagrammatic form, typical arrangements for carrying out the process of my invention which will be further described in connection therewith. In the drawing, Fig. 1 illustrates a simplified form of apparatus in which fractionation of the products from the polymerization unit into a stabilized polymer gasoline fraction, an overhead release gas fraction, and an intermediate fraction to be recirculated, is effected in a single rectifying zone. In this arrangement the butylene-enriched fraction to be recirculated is taken off as one or more side streams from the stabilizing tower. The modified arrangement illustrated in Fig. 2 provides a second fractionating tower adapted to segregate and separately recover a fraction consisting of hydrocarbons having 4 carbon atoms per molecule for subsequent separate use, as, for example, in an alkylation process. When using the modified arrangement of apparatus illustrated in Fig. 2 a portion of this separately recovered fraction, particularly when it contains a substantial proportion of butylenes, may when desired be recycled to the polymerization catalyzing zone to assist in further increasing the butylenes to propylene ratio as above described.

In the arrangement diagrammatically illustrated in Fig. 1 the fresh supply of process gas flows through line 1 into heater 2 where the gas is raised to the correct temperature for the polymerizing operation. The heated gas flows from heater 2 through line 3 into a series of catalyzing towers illustrated collectively as the catalyzing zone 4, thence through a condenser 6, and into a receiver or accumulator 8. A vent line having a suitable back-pressure valve 9 is provided to permit releasing gases from accumulator 8 whenever the vapor pressure of the composite mixture supplied to accumulator 8 exceeds the discharge pressure at which the polymerization unit functions most efficiently. In the normal operation of the process of my invention no gases are released through valve 9. Liquid which accumulates in 8 is discharged through line 12 and this is forced by pump 11 into a stabilizing tower 13 which may be, and usually will be, operated at a pressure higher than that prevailing in the accumulator 8. This stabilizing tower is provided at its lower end with suitable heating means 14. In the illustrated arrangement gases discharged from the upper end of the stabilizing tower pass through cooler 17 to accumulator 18. Adequate cooling and refluxing at the upper portion of tower 13 may be provided by return of cooled condensate from accumulator 18 by means of pump 19. Stabilized polymer gasoline is drawn off from the lower end of tower 13 through line 20 and gases are released from accumulator 18 through line 21.

An intermediate fraction is drawn off from tower 13 as an appropriately selected side stream and recirculated via lines 22 and 23 to the inlet of heater 2. A portion of this material drawn off as a side stream through line 22 may be diverted to storage through line 24 if desired; for example, for use as casinghead gasoline or for supplying a source of isobutane for an alkylation process.

Advantageously the stabilizing tower 13 will be controlled so that the stabilized polymer gasoline withdrawn through line 20 will be free from hydrocarbons containing less than 4 carbon atoms, while the well fractionated gas mixture released through line 21 will be free or substantially free from hydrocarbons containing more than 3 carbon atoms per molecule, depending upon whether or not total retention of the hydrocarbons having 4 carbon atoms per molecule is desired. By proper selection of the side stream, the intermediate fraction drawn off through line 22 will consist predominantly of hydrocarbons having 4 carbon atoms per molecule and the ratio of butylenes to propylene in such fraction will greatly exceed the corresponding ratio in the composite mixture supplied to the catalyzing zone 4. In the illustrated arrangement a line 34 is provided to permit recirculation through the heater of a part of the gas ordinarily vented from accumulator 18 through line 21. However, in the normal operation of my process this line is not used although it may be used during the starting up period or in the case of an excessive temporary reduction in the supply of fresh gases.

In the arrangement illustrated in Fig. 2 provision is made for discharging the bottoms fraction from stabilizer 13 through line 25 to a second rectifying tower 26. Tower 26, like tower 13, is provided with a suitable heating means 27 at its lower end, and with a cooler 28, receiver 29 and pump 30 for supplying cooling and refluxing action at its upper end. The arrangement illustrated in Fig. 2 provides for further stabilization of the bottoms fraction from tower 13 in tower 26. This arrangement is especially adapted to recover as an overhead product a fraction consisting exclusively of hydrocarbons having 4 carbon atoms per molecule. This fraction may be drawn off from receiver 29 through line 33 and diverted to storage. It may be used as a source of isobutane for an alkylation plant, for casinghead, or for any other desired purpose. The stabilized polymer gasoline, relatively free from hydrocarbons containing less than 5 carbon atoms, is drawn off from tower 26 through line 31. A portion of the overhead product from tower 26 may be recycled to the catalyzing zone 4 via line 32 to assist in further increasing the ratio of butylenes to propylene in the catalyzing zone. In the operation of the arrangement illustrated in Fig. 2, a side stream may be drawn off from tower 13 through line 22 and recirculated in its entirety or in part through the catalyzing zone as described in connection with the operation of the arrangement shown in Fig. 1. However, if desired, the modification illustrated in Fig. 2 may be operated so as to obtain from tower 13 only an overhead fraction free or substantially free from hydrocarbons containing more than 3 carbon atoms and a bottoms fraction free from hydrocarbons containing less than 4 carbon atoms. When so operating, the material to be recycled may be obtained in its entirety from the overhead fraction from tower 26. Such fraction may be in part recycled through lines 32 and 23, and in part drawn off through line 33. It may consist substantially exclusively of hydrocarbons having 4 carbon atoms per molecule.

One method of operating the arrangement illustrated in Fig. 2 which possesses several advantages in certain instances involves controlling tower 13 to eliminate butylenes substantially completely from the bottoms discharged through lines 20 and 25, and controlling tower 26 to separate an overhead fraction consisting essentially of n-butane.

The following specific operations will serve to illustrate the advantages of the process of my invention as applied to the treatment of a typical refinery olefin-containing gas mixture the approximate composition of which is given in Table I.

EXAMPLE I

Using this typical gas mixture as the source of fresh material supplied to line 1, in an arrangement such as that illustrated in Fig. 1 and with phosphoric acid distributed on an inert carrier as the catalyst, the fresh gas mixture was supplied at a rate of 100 volume units per hour on the liquid basis. This material was admixed with recycle stock from line 23 and the mixture, after heating to a temperature approximating 450° F. in heater 2, was passed through the catalyzing zone 4 and condenser 6 to accumulator 8. The maximum temperature attained in the catalyzing zone remained below 550° F. and the discharge pressure from the catalyzing zone remained between 150 and 200 lbs. per square inch. The liquid products accumulating in 8 were forced by pump 11 through a conventional heat exchanger and preheater, not shown, and thence into an intermediate portion of stabilizing tower 13. Tower 13 was controlled to separate a bottoms fraction free from hydrocarbons containing less than 4 carbon atoms per molecule, an overhead fraction free from hydrocarbons containing more than 3 carbon atoms per molecule which was released through line 21, and a side stream the composition of which is hereinafter described. This side stream was recirculated in its entirety through line 23 and no gas was vented from accumulator 8 through valve 9 so that total retention of the hydrocarbons containing 4 carbon atoms was accomplished.

Operating as above described the bottoms fraction was drawn off from tower 13 at a rate of 65.5 volume units per hour on the liquid basis. It contained 42.8% of polymerized hydrocarbons containing 5 or more carbon atoms, indicated collectively in the following tables by the symbol $C_{5+}$. Stabilizer release gas was vented through line 21 at a rate of 27.6 volume units per hour on the liquid basis. The side stream drawn off from tower 13 through line 22 and recirculated in its entirety through line 23 amounted to 100 volume units per hour on the liquid basis. The composite feed to the heater 2 and catalyzing zone 4 therefore represented 200 volume units per hour on the liquid basis. Due to the condensation effected in the catalyzing zone the total products discharged from the catalyzing zone to accumulator 8 amounted to 193.1 volume units per hour on the liquid basis. The vapor pressure of the stabilizer bottoms at 100° F. was 35 lbs. per square inch while that of the composite mixture discharged from the catalyzing zone to accumulator 8 was 128 lbs. at 100° F. Since this pressure was materially lower than the pressure prevailing in the catalyzing zone it was not necessary to provide excessive cooling in condenser 6 in order to avoid the necessity of releasing gas from accumulator 8 through valve 9. The approximate compositions of the fresh feed, of the recycle stock, of the composite feed to the catalyzing zone, of the composite products discharged from the catalyzing zone, of the stabilizer release gas vented from line 21 and of the stabilizer bottoms discharged from line 20, are given in Table I. In all instances percentages are given as percentages by volume on the liquid basis.

Table I

|  | Fresh feed | Recycle stock | Comp. to cat. zone | Comp. from cat. zone | Stab. rel. | Stab. btms. |
|---|---|---|---|---|---|---|
| Ethane | 6.4 | 3.9 | 5.1 | 5.3 | 23.2 | -------- |
| Propylene | 10.6 | 1.0 | 5.8 | 1.3 | 5.8 | -------- |
| Propane | 19.6 | 11.8 | 15.7 | 16.3 | 71.0 | -------- |
| Butylenes | 30.4 | 16.9 | 23.7 | 12.7 | -------- | 11.6 |
| Butanes | 29.9 | 66.4 | 48.2 | 49.9 | -------- | 45.6 |
| $C_{5+}$ | 3.1 | 0.0 | 1.5 | 14.5 | -------- | 42.8 |

It will be noted that by recirculation of a selected stabilizer side stream as above described the content of olefins containing 3 and 4 carbon atoms, originally 41% in the fresh charge, was reduced to 29.5% in the composite feed. Yet the ratio of butylenes to propylene was increased from a value of 2.87 to 1 for the fresh charge to a value of 4.08 to 1 for the composite feed to the catalyzing zone. The ratio of butylenes to propylene in the side stream recycle stock was 16.9 to 1.

Example II

A second operation was carried out in the arrangement illustrated in Fig. 1 using as the fresh charge an olefin-containing gas mixture having substantially the same composition as that employed in the operation of Example I. In this second operation the same catalyst was employed. Likewise the temperatures and pressures in the heater 2 and catalyzing zone 4 were the same as in the operation of Example I. However, in this second operation no side stream was drawn off from stabilizer tower 13. Instead this tower was controlled to separate only a bottoms fraction free from hydrocarbons containing less than 4 carbon atoms and an overhead fraction free from hydrocarbons containing more than 3 carbon atoms. By such control, total retention of the $C_4$ hydrocarbons was accomplished in this operation as well as in the operation of Example I. However, in this operation only a portion of the composite stabilizer overhead was released from the system through line 21, while another portion was recirculated through line 34 to the inlet of heater 2. No gas was vented from accumulator 8 through valve 9.

In the operation of Example II the fresh gas mixture was supplied through line 1 at a rate of 100 volume units per hour on the liquid basis, as in the operation of Example I. The bottoms fraction was drawn off from tower 13 at a rate of 64.2 volume units per hour on the liquid basis. This bottoms fraction contained 39.2% of polymerized hydrocarbons containing 5 or more carbon atoms. Stabilizer release gas was vented through line 21 at a rate of 29.7 volume units per hour on the liquid basis. Stabilizer overhead of the same composition as the release gas was recirculated through line 34 at a rate of 67.7 volume units per hour on the liquid basis. The composite feed to the heater 2 and catalyzing zone 4 therefore represented 167.7 volume units per hour on the liquid basis. Due to the condensation effected in the catalyzing zone the total products discharged from the catalyzing zone to accumulator 8 amounted to 161.6 volume units per hour on the liquid basis. The vapor pressure of the stabilizer bottoms at 100° F. was 37 lbs. per square inch, while that of the composite mixture discharged from the catalyzing zone to accumulator 8 was 237 lbs. at 100° F. Excessive cooling in condenser 6 was therefore required in order to avoid the necessity of releasing gas from accumulator 8 through valve 9.

The approximate compositions of the fresh feed, of the recycle stock, of the composite feed to the catalyzing zone, of the composite mixture discharged from the catalyzing zone, of the stabilizer release gas vented from line 21 and of the stabilizer bottoms discharged from line 20 for the operation of Example II are given in Table II. As in Table I the percentages are given in all instances as percentages by volume on the liquid basis.

Table II

|            | Fresh feed | Recycle stock | Comp. to cat. zone | Comp. from cat. zone | Stab. rel. | Stab. btms. |
|------------|-----------|---------------|--------------------|-----------------------|------------|-------------|
| Ethane     | 6.4       | 21.5          | 12.5               | 12.9                  | 21.5       |             |
| Propylene  | 10.6      | 12.5          | 11.4               | 7.5                   | 12.5       |             |
| Propane    | 19.6      | 66.0          | 38.3               | 39.8                  | 66.0       |             |
| Butylenes  | 30.4      |               | 18.1               | 5.6                   |            | 14.2        |
| Butanes    | 29.9      |               | 17.8               | 18.5                  |            | 46.6        |
| $C_{5+}$   | 3.1       |               | 1.9                | 15.6                  |            | 39.2        |

It will be noted that by recirculation of a portion of the stabilizer overhead, when controlling the stabilizer to effect total retention of $C_4$ hydrocarbons in the liquid products from the stabilizer, the content of olefins containing 3 and 4 carbon atoms in the composite feed was reduced to 29.5% just as in the operation of Example I. However, this method of operation decreased the ratio of butylenes to propylene from a value of 2.87 to 1 for the fresh charge, to a value of 1.59 to 1 for the composite feed to the catalyzing zone.

Comparison of the operation of Example I with that of Example II, shows that in the former both the total amount of propylene passed through the catalyzing zone and the concentration of propylene in the composite mixture supplied to the catalyzing zone were substantially less than in the operation of Example II. Yet the amount of propylene polymerized was 30% higher in the operation of Example I as compared to that of Example II. The operation of Example I also produced an increase of 7.0% in the amount of butylenes polymerized and an increase of 13.6% in hydrocarbons containing 5 or more carbon atoms produced by polymerization, as compared to the operation of Example II.

The process of my invention also possesses marked advantages over the processes of the prior art even when the polymerizing plant is not operated to effect total retention of hydrocarbons containing 4 carbon atoms per molecule. This is illustrated by the following examples.

Example III

Using as the source of raw material an olefin-containing gas mixture having substantially the same composition as that employed in the operations of Examples I and II, a third operation was carried out in the arrangement of apparatus illustrated in Fig. 1. In this third operation, the catalyst, the temperature in the catalyzing zone, and the pressure in the catalyzing zone were substantially the same as in the operation of Examples I and II. Likewise the fresh gas mixture was supplied to line 1 at a rate of 100 volume units per hour on the liquid basis, as in the operations previously described. This fresh feed was admixed with recycle stock from lines 22 and 23, and the mixture was passed through heater 2, catalyzing zone 4 and condenser 6 to accumulator 8, as in the operations previously described. No gas was vented from accumulator 8 through valve 9. Liquid from accumulator 8 was pumped to stabilizing tower 13. Tower 13 was controlled to separate a bottoms fraction free from hydrocarbons containing less than 4 carbon atoms per molecule, a side stream the composition of which is given in Table III, and an overhead fraction which was free from hydrocarbons containing 5 or more carbon atoms but which contained approximately 35% of hydrocarbons containing 4 carbon atoms per molecule. The side stream was recirculated in its entirety. The overhead fraction was discharged from the system. It will be apparent that the fractionation effected in tower 13 in this operation is much less sharp than that in the operations of Examples I and II.

Operating as described, the bottoms fraction was drawn off from tower 13 at a rate of 50.1 volume units per hour on the liquid basis. It contained 55.1% of polymerized hydrocarbons containing 5 or more carbon atoms. The stabilizer release gas was vented through line 21 at a rate of 43.1 volume units per hour on the liquid basis. The side stream, drawn off through line 22 and recirculated, amounted to 97.5 volume units per hour on the liquid basis. The composite feed to heater 2 and catalyzing zone 4 represented 197.5 volume units per hour on the liquid basis. The total products discharged from the catalyzing zone amounted to 190.7 volume units per hour. The vapor pressure on the stabilizer bottoms at 100° F. was 29 lbs. per square inch, while that of the composite mixture discharged from the catalyzing zone to accumulator 8 was 136 lbs. at 100° F. This pressure was materially lower than the pressure prevailing in the catalyzing zone. Accordingly, as in the operation of Example I, excessive cooling in condenser 6 was not required in order to avoid the necessity of releasing gas from accumulator 8 through valve 9. The approximate compositions of the fresh charge, of the final products, of the recycle stock and of the composite intermediates supplied to and discharged from the catalyzing zone, in the operation of Example III, are given in Table III. The percentages, as in the preceding tables, are percentages by volume on the liquid basis.

*Table III*

|  | Fresh feed | Recycle stock | Comp. to cat. zone | Comp. from cat. zone | Stab. rel. | Stab. btms. |
|---|---|---|---|---|---|---|
| Ethane | 6.4 | 4.7 | 5.6 | 5.8 | 14.9 | |
| Propylene | 10.6 | 1.5 | 6.1 | 1.9 | 4.9 | |
| Propane | 19.6 | 14.4 | 17.0 | 17.6 | 45.4 | |
| Butylenes | 30.4 | 16.2 | 23.4 | 12.3 | 7.0 | 9.2 |
| Butanes | 29.9 | 63.2 | 46.3 | 47.9 | 27.8 | 35.7 |
| C₅+ | 3.1 | 0.0 | 1.6 | 14.5 | 0.0 | 55.1 |

It will be noted that in the operation last described the content of olefins containing 3 and 4 carbon atoms, originally 41% in the fresh charge, was reduced to 29.5% in the composite feed just as in the operations of Examples I and II. However, by recirculation of the selected stabilizer side stream, the ratio of butylenes to propylene was increased from a value of 2.87 to 1 for the fresh charge to a value of 3.84 to 1 for the composite feed to the catalyzing zone. The ratio of butylenes to propylene in the side stream recycle stock was 10.8 to 1.

EXAMPLE IV

A fourth operation was carried out in an arrangement of apparatus such as that illustrated in Fig. 1 using as the fresh charge a gas mixture of substantially the same composition as that employed in the operations previously described and with the catalyst and the temperatures and pressures in the catalyzing zone the same as those employed in the three operations already described. In this fourth operation as in the preceding examples, the fresh gas mixture was supplied at a rate of 100 volume units per hour on the liquid basis. The method of operation was the same as that employed in the operation of Example II except that, as in the operation of Example III, the stabilizing tower 13 was controlled, by reducing the sharpness of the fractionation, to include a considerable portion of the hydrocarbons containing 4 carbon atoms per molecule in the stabilizer overhead released through line 21. Accordingly, that portion of the stabilizer overhead recirculated via line 34 also contained a considerable proportion of hydrocarbons containing 4 carbon atoms per molecule. Stabilizer bottoms were withdrawn from tower 13 at a rate of 48.6 volume units per hour on the liquid basis and stabilizer release gas was vented through line 21 at a rate of 45.2 volume units per hour on the liquid basis. That portion of the stabilizer overhead recirculated through heater 2 via line 34 amounted to 84.5 volume units per hour on the liquid basis. The composite feed to the heater 2 and catalyzing zone 4 therefore represented 184.5 volume units per hour, while the total products discharged from the catalyzing zone to accumulator 8 amounted to 178.3 volume units per hour, both on the liquid basis. The vapor pressure of the stabilizer bottoms at 100° F. was 30 lbs. per square inch while that of the composite mixture discharged from the catalyzing zone to accumulator 8 was 204 lbs. at 100° F. Since the latter vapor pressure was materially higher than the pressure prevailing in the catalyzing zone, excessive cooling in condenser 6 was required in order to avoid the necessity of releasing gas from accumulator 8 through valve 9, just as was the case in operation of Example II. The approximate compositions of the fresh feed, of the recycled material, of the vented stabilizer overhead, of the stabilizer bottoms and of the intermediate composites supplied to and discharged from the catalyzing zone for this operation are given in Table IV, the percentages being by volume on the liquid basis as in the preceding tables.

*Table IV*

|  | Fresh feed | Recycle stock | Comp. to cat. zone | Comp. from cat. zone | Stab. rel. | Stab. btms. |
|---|---|---|---|---|---|---|
| Ethane | 6.4 | 14.2 | 10.0 | 10.3 | 14.2 | |
| Propylene | 10.6 | 9.3 | 10.0 | 6.8 | 9.3 | |
| Propane | 19.6 | 43.4 | 30.4 | 31.6 | 43.4 | |
| Butylenes | 30.4 | 6.6 | 19.5 | 7.4 | 6.6 | 9.5 |
| Butanes | 29.9 | 26.5 | 28.4 | 29.3 | 26.5 | 36.8 |
| C₅+ | 3.1 | 0.0 | 1.7 | 14.6 | 0.0 | 53.7 |

It will be noted that the method of recirculation employed in the operation of Example IV had the effect of reducing the content of olefins containing 3 and 4 carbon atoms, originally 41% in the fresh charge, to 29.5% in the composite feed just as in each of the operations previously described. However, as in the operation of Example II, the ratio of butylenes to propylene was materially decreased.

Comparison of the operation of Example III with that of Example IV shows that in the former both the total amount of propylene passed through the catalyzing zone and the concentration of propylene in the composite mixture supplied to the catalyzing zone were substantially less than in the operation of Example IV. Yet the amount of propylene polymerized in the operation of Example III was more than 30% higher than in the operation of Example IV. The amount of butylenes polymerized in the operation of Example III was not less than that in the operation of Example IV. Moreover, the total amount of hydrocarbons containing 5 or more carbon atoms produced by polymerization was approximately 6.5% higher in the operation of Example III than in the operation of Example IV.

It will be noted that recirculation of the selected intermediate fraction in the operations of Examples I and III reduced the content of "higher olefins" in the composite feed to the catalyzing operation to values substantially below that prevailing in the fresh charging material.

Yet the vapor pressure of the composite mixture discharged from the catalyzing zone was depressed to a value which, at 100° F., was well below the pressure prevailing in the catalyzing zone and at which it operated most efficiently for polymerizing olefins. On the other hand recirculation of the stabilizer overhead as in the operations of Examples II and IV decreased the ratio of butylenes to propylene in the composite feed and increased the vapor pressure of the composite mixture discharged from the catalyzing zone to a value which, at 100° F., was well above the pressure prevailing in the catalyzing zone. These effects occurred in the operation of Example IV notwithstanding the inclusion of a considerable proportion of propylene and butylenes in the stabilizer overhead fraction which was recirculated.

While the specific operations described herein exemplify the process of my invention and the advantages to be derived therefrom, it will of course be understood that my invention is not limited thereto and that numerous modifications may be made without departing from the spirit of the invention.

I claim:

1. In the production of polymerized olefins wherein a gaseous mixture containing a substantial amount of both butylenes and propylene is passed in contact with a catalyst and the product of the catalyzing operation is subjected to a stabilizing operation in a rectifying zone, the improvement which comprises separating the mixture in said rectifying zone into a bottoms fraction containing polymerized olefins and substantially free from hydrocarbons containing less than 4 carbon atoms per molecule, an overhead fraction containing not more than a relatively minor proportion of hydrocarbons of more than 3 carbon atoms per molecule, and an intermediate fraction containing at least a substantial proportion of butylenes, the ratio of butylenes to propylene in said intermediate fraction substantially exceeding the corresponding ratio in the composite gaseous mixture supplied to the catalyzing operation, and recirculating said intermediate fraction to said catalyzing operation.

2. In the production of polymerized olefins wherein a gaseous mixture containing a substantial amount of both butylenes and propylene is passed in contact with a catalyst and the product of the catalyzing operation is subjected to a stabilizing operation in a rectifying zone, the improvement which comprises separating the mixture in said rectifying zone into a bottoms fraction containing polymerized olefins and substantially free from hydrocarbons containing less than 4 carbon atoms per molecule, an overhead fraction substantially free from hydrocarbons of more than 3 carbon atoms per molecule, and an intermediate fraction containing at least a substantial proportion of butylenes, the ratio of butylenes to propylene in said intermediate fraction substantially exceeding the corresponding ratio in the composite gaseous mixture supplied to the catalyzing operation, and recirculating said intermediate fraction to said catalyzing operation.

3. In the production of polymerized olefins wherein a gaseous mixture containing a substantial amount of both butylenes and propylene is passed in contact with a catalyst and the product of the catalyzing operation is subjected to fractionation in rectifying zones, the improvement which comprises separating the mixture in said rectifying zones into a bottoms fraction containing polymerized olefins and substantially free from hydrocarbons containing less than 4 carbon atoms per molecule, an overhead fraction substantially free from hydrocarbons of more than 3 carbon atoms per molecule, and an intermediate fraction consisting essentially of butylenes and butanes, the ratio of butylenes to propylene in said intermediate fraction substantially exceeding the corresponding ratio in the composite gaseous mixture supplied to the catalyzing operation, and recirculating at least a part of said intermediate fraction to said catalying operation.

4. In the production of polymerized olefins wherein a gaseous mixture containing a substantial amount of both butylenes and propylene is passed in contact with a catalyst and the product of the catalyzing operation is subjected to a stabilizing operation in a rectifying zone, the improvement which comprises separating the mixture in said rectifying zone into a bottoms fraction containing polymerized olefins and substantially free from hydrocarbons containing less than 4 carton atoms per molecule, an overhead fraction containing not more than a relatively minor proportion of hydrocarbons of more than 3 carbon atoms per molecule and a liquid side stream, said side stream containing at least a substantial proportion of butylenes and having a ratio of butylenes to propylene substantially exceeding the corresponding ratio in the composite gaseous mixture supplied to the catalyzing operation, and recirculating said side stream to said catalyzing operation.

5. In the production of polymerized olefins wherein a gaseous mixture containing a substantial amount of both butylenes and propylene is passed in contact with a catalyst and the product of the catalyzing operation is subjected to a condensing operation wherein the temperature is reduced to a value not exceeding about 100° F., the improvement which comprises supplying condensate from said condensing operation to a stabilizing operation and there separating the components of said condensate in rectifying zones into a bottoms fraction containing polymerized olefins and substantially free from hydrocarbons containing less than 4 carbon atoms per molecule, an overhead fraction containing not more than a relatively minor proportion of hydrocarbons of more than 3 carbon atoms per molecule, and an intermediate fraction, said intermediate fraction containing at least a substantial proportion of hydrocarbons having 4 carbon atoms per molecule, the ratio of butylenes to propylene in said intermediate fraction substantially exceeding the corresponding ratio in the composite gaseous mixture supplied to the catalyzing operation, and recirculating to the catalyzing operation at least a part of said intermediate fraction adequate to maintain the vapor pressure of the composite mixture discharged from said catalyzing operation at a value which at about 100° F. does not exceed the pressure prevailing in said condensing operation.

6. In the production of polymerized olefins wherein a gaseous mixture containing a substantial amount of both butylenes and propylene is passed in contact with a catalyst and the product of the catalyzing operation is subjected to a condensing operation wherein the temperature is reduced to a value not exceeding about 100° F., the improvement which comprises supplying condensate from said condensing operation to a stabilizing operation and there separating the components of said condensate in rectifying zones into a bottoms fraction containing polymerized olefins and substantially free from hydrocarbons containing less than 4 carbon atoms per molecule, an overhead fraction containing not more than a relatively minor proportion of hydrocarbons of more than 3 carbon atoms per molecule, and an intermediate fraction, said intermediate fraction containing at least a substantial proportion of hydrocarbons having 4 carbon atoms per molecule, the ratio of butylenes to propylene in said intermediate fraction substantially exceeding the corresponding ratio in the composite gaseous mixture supplied to the catalyzing operation, and recirculating to the catalyzing operation at least a part of said intermediate fraction adequate to maintain the vapor pressure of the composite mixture discharged from said catalyzing operation at a value which at about 100° F. does not exceed the pressure at which polymerization is effected most efficiently in said catalyzing zone.

7. In the production of polymerized olefins wherein a gaseous mixture containing a substantial amount of both butylenes and propylene is passed in contact with a catalyst and the product of the catalyzing operation is subjected to fractionation in rectifying zones, the improvement which comprises separating the mixture in said rectifying zones into a bottoms fraction containing polymerized olefins and not more than a minor amount of hydrocarbons containing less than 5 carbon atoms per molecule, an overhead fraction substantially free from hydrocarbons of more than 3 carbon atoms per molecule, a light intermediate fraction containing at least a substantial proportion of butylenes, the ratios of butylenes to propylene in said light intermediate fraction substantially exceeding the corresponding ratio in the raw gas mixture supplied to the catalyzing operation, and a second intermediate fraction containing a substantial proportion of butylenes and consisting essentially of hydrocarbons containing 4 carbon atoms per molecule, recirculating said light intermediate fraction to said catalyzing operation, and recirculating a portion of said second intermediate fraction to said catalyzing operation.

RODERICK DONALD PINKERTON.